LIGHT PEN CASING AND CIRCUIT IN WHICH THE OUTPUT SIGNAL IS
ENABLED WHEN TWO SPACED SURFACE PORTIONS ARE BOTH ENGAGED
BY THE OPERATOR'S HAND
Filed July 3, 1967

INVENTORS.
TIMOTHY D. STUPAR
CARL T. THOMAS
BY
Elliott & Pastoriza
ATTORNEYS.

United States Patent Office 3,475,612
Patented Oct. 28, 1969

3,475,612

LIGHT PEN CASING AND CIRCUIT IN WHICH THE OUTPUT SIGNAL IS ENABLED WHEN TWO SPACED SURFACE PORTIONS ARE BOTH ENGAGED BY THE OPERATOR'S HAND

Timothy D. Stupar, Venice, and Carl T. Thomas, Van Nuys, Calif., assignors to Information Control Corporation, El Segundo, Calif., a corporation of California Filed July 3, 1967, Ser. No. 650,785
Int. Cl. H01j 39/12
U.S. Cl. 250—214 4 Claims

ABSTRACT OF THE DISCLOSURE

A light pen includes a photo-responsive circuit which will, in cooperation with a low impedance amplifier, provide an output signal when the axis of the pen is directed towards a light source exceeding a given intensity. The photo responsive circuit and amplifier within the pen are placed in an operative condition by a touch contact wherein the operator simply short circuits, essentially with his finger, two insulated portions of the casing itself thereby eliminating conventional switches. In addition, the pen is energized through the same cable conductor carrying the output signal to the end that a very lightweight cable structure connecting to the pen may be provided.

This invention relates generally to light pens and more particularly to an improved light pen facilitating the selecting of various lights on a display to provide signals for a computer. The computer in turn is programmed to provide desired output information in accord with the particular portion of the display designated by the light pen.

Light pens have been provided heretofore and generally take the form of an elongated structure adapted to be held in an operator's hand and directed towards different lights on a display screen such as a cathode ray tube. In this respect, the operator utilizes the light pen to "read" information from the display which information is generally provided by a programmed computer. As a very simple illustration, the display on the screen may be a map and include lights positioned at the physical locations of various cities on the map. The light pen and display screen itself connect to a computer programmed, for example, to provide a population reading for each of the various cities. When an operator directs the light pen towards a particular light designating a particular city on the map, the light pen will detect the light and provide a signal to the computer which in turn will then immediately provide a reading of the population of that city. Moving of the pen or directing its axis to receive the light denoting another city will result in the computer providing a display of the population of such other city.

Heretofore, such light pens have generally employed fibre-optic bundles for receiving and directing the light from the display to suitable photo-multiplier tubes which in turn provide a sufficient output signal to the computer. In addition, the pens employed included mechanical or micro-switches for actuating the same. Generally, these light pens have been relatively bulky in order to accommodate the actual physical structure required for their operation. In addition, there has been necessary a multi-conductor cable connecting the pen to the computer in order that sufficient conductors are provided for passing the output signal from the pen and transmitting power to the circuits within the pen for operating the same. The multi-conductor cable has been somewhat bulky and resulted in difficulty in the operator readily pointing the pen at various lights in the display.

With the foregoing considerations in mind, it is a primary object of the present invention to provide a greatly improved light pen wherein the above problems are overcome.

More particularly, it is an object to provide a light pen of physical dimensions corresponding substantially to that of an ordinary fountain pen and which avoids the use of fibre-optics and photo-multiplier tubes and instead incorporates solid state circuitry. This circuitry is so packaged that a compact and light structure results to the end that the general bulkiness heretofore characterizing prior pens is avoided.

Another important object is to provide an improved light pen which can readily be actuated by the operator by simply touching a portion of the pen casing rather than having to actuate a physical switch with the resulting advantage that the pen may be of a streamlined configuration and more easily used than prior pens.

Still another important object is to provide a light pen incorporating a circuit such that a single conductor may be employed for passing the output signal from the pen to a computer and also for providing energizing voltage for the circuits within the pen from an external source. The result is that the cable extending from the pen to the computer may be fairly small, light and flexible so that again the actual use of the pen is facilitated.

A better understanding of the invention will now be had by referring to a preferred embodiment thereof as illustrated in the accompanying drawings, in which.

Figure 1:
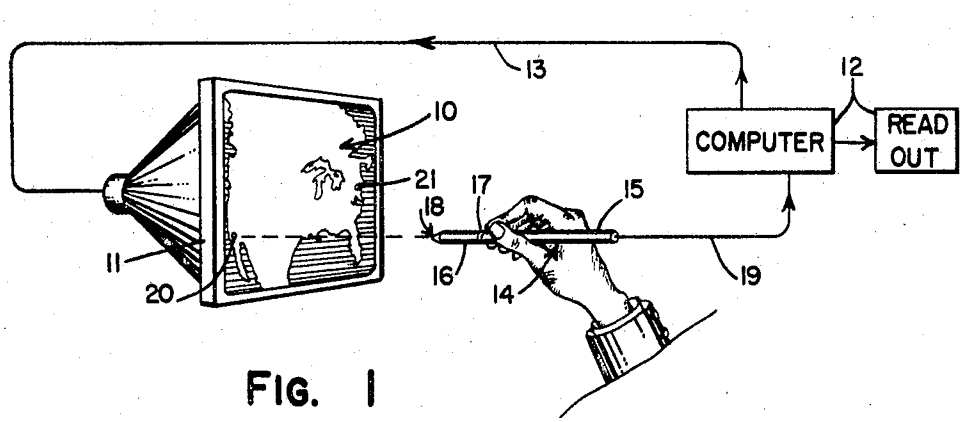
FIGURE 1 is a highly diagrammatic illustration of the light pen and one example of the manner in which the same is used.

Referring first to FIGURE 1, there is illustrated a map 10 on a display screen 11 which may constitute a cathode ray tube. Information for the display screen is provided by a computer 12 through a line 13.

Also illustrated in FIGURE 1 is the light pen 14 of this invention held in an operator's hand. This light pen includes first and second casing sections 15 and 16 separated by a ring of insulation 17. One end of the light pen constitutes a light receiving means 18 and the opposite end is connected through a cable 19 to the computer 12.

As a very simple illustrative example of one use for the light pen as illustrated in FIGURE 1, assume that the map 10 on the display unit 11 is a map of the United States including various bright spots or light sources such as indicated at 20 and 21 for two major cities on the map. Assume further that the computer 12 is programmed such that when the light pen 14 is directed with the axis A of its casing directed at any particular light, the read out portion of the computer will indicate the population of the city designated by the particular light. Thus, if the light pen 14 is directed toward the light source 20 on the map 10, which may correspond to San Francisco, the incoming light along the axis A to the pen will result in an output signal on the cable 19 to the computer and the computer will then provide a display on its read out of the population of San Francisco.

If the light pen is then directed toward the light 21 on the map 10, which may correspond to New York City, the computer will provide a read out of the population of New York City. Similarly, if the light pen axis A is directed toward any of the other light sources on the map 10, the desired output information will be displayed.

One very simple means for programming the computer to realize the foregoing when the light pen 14 is directed as described would be to have the light sources 20 and 21 emitting light pulses in a timed sequence such as might occur if the display map 10 were provided by a conventional raster pattern on a cathode ray tube. The light pen 14, in turn, would provide an output signal pulse at the repetition rate of the raster scanning and these signal pulses would then be compared with the energizing signal for the particular light on the map. If the two signals were in time phase, the computer would provide a read out corresponding to that particular light and thus to the desired information about the particular city designated by that light.

Figure 2:
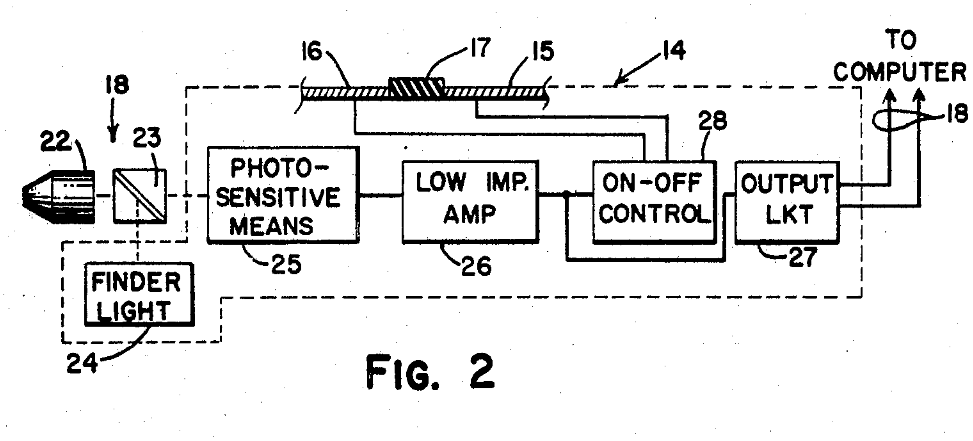
FIGURE 2 is a schematic block diagram of the basic components making up the light pen shown in FIGURE 1.

Referring now to FIGURE 2, the basic components of the light pen which will provide a desired output pulse each time an input light pulse is received are illustrated in block diagram form. Referring first to the light receiving and directing means 18 at the front end of the pen, there is provided a lens 22 and, in the particular embodiment illustrated, a beam splitter 23 cooperating with a finder light source 24 built into the casing of the pen. This finder light 24 will direct a beam of light on the beam splitter 23 which will be reflected through the lens 22 along the axis of the casing and thus facilitate the directing of this axis of the casing towards a particular light on the display.

The light on the display in turn will be received through the lens 22 and passed through the beam splitter 23 directly to a photo-sensitive means 25. The output from the photo-sensitive means 25 passes to a low impedance amplifier 26 which may include part of the photo-sensitive means 25, although illustrated separately for convenience in FIGURE 2. The output from the low impedance amplifier passes through an output circuit 27 to the cable 18 and computer.

Surface portions of the casing sections 15 and 16 are diagrammatically illustrated in FIGURE 2 as separated by the ring of insulation 17. These surface portions connect to an on-off control circuit 28 and the arrangement is such that when the surface portions 16 and 17 are short circuited as by a portion of an operator's hand, the various circuits in the light pen are actuated. In this respect, it will be noted that casing section 16 disposed between the light receiving and finding means 18 and insulation ring 17 may readily be engaged by the operator's index finger when he is holding the light pen in a normal manner to direct it toward various light sources on the map. Thus, the actuation of the circuit is readily effected without the necessity of other switches. The operator need only touch the forward section 16 of the casing.

Figure 3:
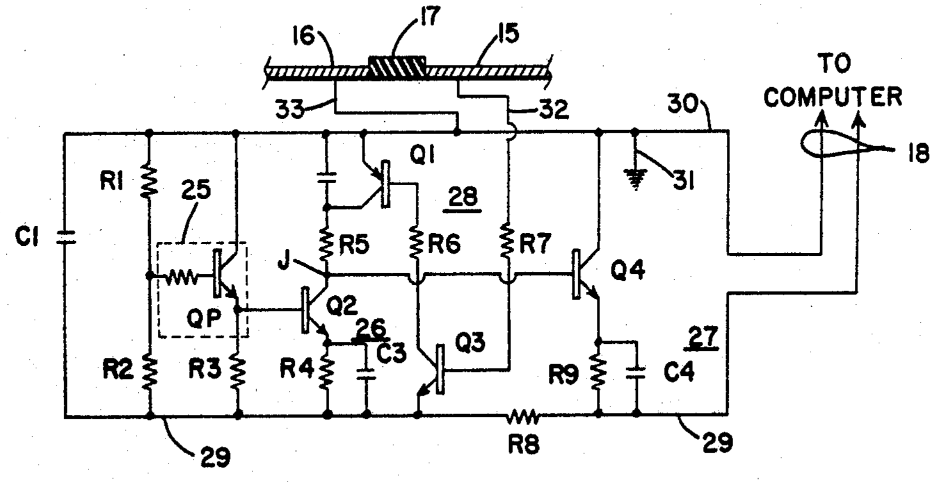
FIGURE 3 is a detailed diagram of the circuits employed in the light pen.

Referring now to the detailed circuit of FIGURE 3, power for energizing the light pen circuits is derived through the same cable 18 employed for passing an output signal from the light pen to the computer. Thus, as shown in the right hand portion of FIGURE 3, the cable 18 includes two conductors 29 and 30. The conductor 29 serves to receive negative energizing voltage for the remaining portion of the circuit and also to pass the output signal to the computer. The conductor 30 constitutes a ground conductor as indicated at 31.

Referring now to the left portion of FIGURE 3, the photo-sensitive means 25 constitutes a photo-transistor Q*p* having its emitter and collector connected between the power line 29 and ground line 30 as shown. Base voltage for the photo-transistor Q*p* is supplied between the resistances R1 and R2. The emitter terminal of Q*p* connects to the base of a transistor Q2. The emitter of Q2 in turn includes resistance R4 and parallel condenser C3 defining a variable impedance Z connecting the emitter to the line 29. The collector circuit for Q2 includes resistance R5, and switching transistor Q1 connected to the ground line 30. A junction point J is defined between the resistance R5 and collector terminal for Q2 and connects to the base of an emitter follower transistor Q4. The signal on the emitter of Q4 follows the signal on the base supplied from the junction point J and is passed through capacitor C4 to the power lead 29 and the computer in the form of a pulse each time the photo-transistor Q*p* is pulsed by light from a source on the display or map. This latter portion of the circuit corresponds to the output circuit 27 in FIGURE 2.

The on-off control circuit 28 of FIGURE 2 includes the transistors Q1 and Q3 of FIGURE 3. As shown, the casing portions 15 and 16 are connected through conductors 32 and 33 to the base of the transistor Q3 and the ground line 30, respectively. Transistors Q1 and Q3 are biased to an off condition but will be turned on when the operator engages both the casing sections 15 and 16 simultaneously with a portion of his hand. In other words, the decreased resistance between the base of Q3 and ground as a consequence of shorting by the operator's hand of the conductors 32 and 33 renders the base of Q3 less negative to turn on this transistor, which action in turn, turns on the transistor Q2 to complete the collector circuit through R5 for the transistor Q2. Removal of the operator's hand portion or finger from the section 16 results in Q3 and Q1 turning off thereby rendering the circuit incapable of generating any signal at the junction point J.

The condenser C1 and resistance R8 in the power line 29 provide a low pass filter to prevent the output signal from the transistor Q4 on the power lead from affecting the other portions of the circuit.

With the above brief description of the various components in mind, the operation of the circuit will now be described.

Initially, the transistors Q*p*, Q2, and Q4 which constitute the basic low impedance pre-amplifier circuit 26 of FIGURE 2, are in a quiescent state. Also, as mentioned, transistors Q1 and Q3 are off and will only be turned on when the operator short circuits the casing portions 15 and 16 with his hand.

Ambient light or normally available light which might pass into the end of the light pen will not provide any output signal in response thereto. This is because such light is either of a steady nature or slowly varying. The gain at the collector of the transistor Q2 of signals resulting from light acting on the photo-transistor Q*p* is approximately proportional to $R5/Z$. The impedance Z constituting the resistance R4 and condenser C3 is quite large for slowly varying signals and thus the gain at the collector of Q2 is small and will not result in any useful output signals. However, when the light pen axis A is directed towards one of the lights such as 20 or 21 on the display, the high frequency or on and off characteristic of the light resulting from the raster pattern or by a deliberate pulsing of the light, results in a very rapid rate of change. The impedance Z becomes small for rapidly changing signals and thus there is a greater increase of the gain at the junction point J for the transistor Q2.

If now the casing sections 15 and 16 are shorted by the operator's hand, the transistor Q3 will be energized as described heretofore and the transistor Q1 will also be energized to provide essentially a direct connection from the upper portion of the resistance R5 to the ground lead 30. The signal now developed at the point J passes to the base of Q4 and appears on the emitter of Q4 to pass through the capacitor C4 to the power line 29 and the computer as described heretofore. It should be understood that there will be provided a pulse type output signal each time the photo-transistor Q*p* is irradiated and if the pulse repetition rate of the light on the display is of the order of 50 kilocycles per second, output pulses at the rate of 50,000 per second will be passed to the computer for time comparison with the initial energizing signal for the display light.

If the operator removes his index finger from the forward portion of the casing 16 to remove the short circuit between the casing portions 15 and 16, the transistors Q3 and Q1 will be turned off as also described heretofore thus opening the collector circuit of the transistor Q2 and rendering it inactive.

It should be understood that only light within a given solid angle relative to the axis A will be received in the light pen. The solid angle of reception may, of course, be varied depending upon the type of lens 22 employed. In fact, a telescopic lens may be used if it is desired to hold the light pen 14 at some distance from the display. In this latter event, the finder light 24 described in FIGURE 2, is extremely useful in aiding the operator to pinpoint a particular light on the map.

From the foregoing description, it will be evident that the present invention has provided a greatly improved light pen wherein the various objects set forth heretofore are fully realized.

What is claimed is:

1. A light pen comprising: an elongated casing adapted to be held by an operator in the manner of a pen, one end of said casing including light receiving means for directing light within a given solid angle relative to the axis of said casing into said one end of said casing; light sensitive means in said casing responsive to light received in said one end exceeding a given intensity to provide a signal; a low impedance amplifier means connected to said light sensitive means to provide an amplified output signal in response to said signal, said casing including spaced surface portions; and an internal on-off control circuit within said casing connected to said low impedance amplifier means and to said spaced surface portions and responsive to a portion of said operator's hand engaging both of said spaced surface portions simultaneously to actuate said low impedance amplifier means to enable generation of said output signal whereby said output signal may be utilized to initiate a desired action when said axis of said casing is directed toward a light source exceeding said given intensity.

2. A light pen according to claim 1, in which said light receiving means includes a beam splitter; and a source of light positioned in said casing to shine through said beam splitter and direct a reflected beam along the axis of said casing from said one end to aid in directing said axis of said casing towards a light to be received in said one end.

3. A light pen according to claim 1, in which said casing is formed of first and second conductive sections separated by a ring of insulation positioned closer to said one end than the opposite end of said casing, said sections respectively defining said surface portions such that the operator's index finger may readily engage the casing section between said one end and said ring of insulation to effect actuation of said low impedance amplifier means.

4. A light pen comprising: an elongated casing adapted to be held by an operator in the manner of a pen, one end of said casing including light receiving means for directing light within a given solid angle relative to the axis of said casing into said one end of said casing; light sensitive means in said casing responsive to light received in said one end exceeding a given intensity to provide a signal; and a low impedance amplifier means connected to said light sensitive means to provide an amplified output signal in response to said signal, said casing including an output cable extending from its end opposite said one end, said output cable including a conductor for said output signal, said same conductor connecting to said low impedance amplifier means to pass energizing voltage from an external source to operate said low impedance amplifier means whereby said output signal may be utilized to initiate a desired action when said axis of said casing is directed toward a light source exceeding said given intensity.

References Cited

UNITED STATES PATENTS

| | | | |
|---|---|---|---|
| 2,915,643 | 12/1959 | Mork | 250—217 |
| 3,130,317 | 4/1964 | Connelly et al. | 250—227 |
| 3,151,248 | 9/1964 | Glaser et al. | 250—227 |
| 3,334,236 | 8/1967 | Bacon | 250—227 X |

THOMAS N. GRIGSBY, Primary Examiner

U.S. Cl. X.R.

250—202, 217, 227, 239